US012271839B2

United States Patent
Palazzo et al.

(10) Patent No.: US 12,271,839 B2
(45) Date of Patent: Apr. 8, 2025

(54) PARTICIPANT ATTENDANCE MANAGEMENT AT EVENTS INCLUDING VIRTUAL REALITY EVENTS

(71) Applicant: AT&T Intellectual Property I, L.P., Atlanta, GA (US)

(72) Inventors: Richard Palazzo, Stewartsville, NJ (US); Brian M. Novack, St. Louis, MO (US); Rashmi Palamadai, Naperville, IL (US); Tan Xu, Bridgewater, NJ (US); Eric Zavesky, Austin, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 127 days.

(21) Appl. No.: 17/541,112

(22) Filed: Dec. 2, 2021

(65) Prior Publication Data
US 2023/0177416 A1 Jun. 8, 2023

(51) Int. Cl.
*G06Q 10/063* (2023.01)
*G06Q 10/0631* (2023.01)
*G06T 11/00* (2006.01)

(52) U.S. Cl.
CPC .......... *G06Q 10/0631* (2013.01); *G06T 11/00* (2013.01)

(58) Field of Classification Search
CPC ............................ G06Q 10/0631; G06T 11/00
See application file for complete search history.

(56) References Cited

U.S. PATENT DOCUMENTS 11,557,093 B1 * 1/2023 Terrano ................. A63F 13/26
11,785,161 B1 * 10/2023 Suiter ................. G06F 40/169
348/231.4
(Continued)

FOREIGN PATENT DOCUMENTS

EP     2930671 A1 * 10/2015 ............. G06Q 10/02

OTHER PUBLICATIONS

M. Hosseini and N. D. Georganas, "MPEG-4 based recording and replay of collaborative virtual reality sessions," Proceedings IEEE Virtual Reality 2002, Orlando, FL, USA, 2002, pp. 271-272 (Year: 2002).*

*Primary Examiner* — Jerry O'Connor
*Assistant Examiner* — Philip N Warner
(74) *Attorney, Agent, or Firm* — Guntin & Gust, PLC; Matthew Tropper

(57) ABSTRACT

Disclosed is managing (creating and maintaining) attendance/participation data describing remote attendance of attendees of an event, or a replay of the event. The event can be a virtual reality event. When a remote user attends an event, subsequent viewers of the event replay can see a digital representation (e.g., an avatar) of the remote user within the replay as having attended the event in-person. Subsequent replays include digital representations of the remote user and the user(s) that viewed previously replay(s) to emulate their attendance. User can manage their own attendance data, including to obtain proof of attendance. A user can delete his or her presence at an event, such that replays after the deletion do not include that user's representation. A user can go anonymous with respect to an event, such that any replays after the anonymity choice include only a generic representation of the attendee.

20 Claims, 12 Drawing Sheets

(56) References Cited

U.S. PATENT DOCUMENTS

| | | | | |
|---|---|---|---|---|
| 2010/0073468 | A1* | 3/2010 | Kutner | G03B 37/00 |
| | | | | 726/26 |
| 2014/0063061 | A1* | 3/2014 | Reitan | G09G 5/14 |
| | | | | 345/633 |
| 2016/0049003 | A1* | 2/2016 | Shuster | A63F 13/355 |
| | | | | 386/230 |
| 2017/0103432 | A1* | 4/2017 | Borchetta | G06Q 30/0279 |
| 2019/0332807 | A1* | 10/2019 | LaFever | H04L 63/0407 |
| 2020/0213316 | A1* | 7/2020 | Takahashi | G06F 21/6218 |
| 2020/0382724 | A1* | 12/2020 | Pena | G06F 3/04883 |
| 2020/0404217 | A1* | 12/2020 | Yerli | G06F 9/46 |
| 2020/0404344 | A1* | 12/2020 | Bathory | H04N 21/2187 |
| 2021/0042854 | A1* | 2/2021 | Hazy | H04L 63/0421 |
| 2021/0056750 | A1* | 2/2021 | Rowley | G06F 3/016 |
| 2021/0354036 | A1* | 11/2021 | Swann | A63F 13/5258 |
| 2021/0397846 | A1* | 12/2021 | Chang | H04N 21/4662 |
| 2021/0399911 | A1* | 12/2021 | Jorasch | H04L 12/1818 |
| 2022/0080305 | A1* | 3/2022 | Guirnalda | H04L 65/61 |
| 2022/0167021 | A1* | 5/2022 | French | H04N 21/2187 |
| 2022/0286657 | A1* | 9/2022 | Oz | H04N 7/157 |
| 2022/0337642 | A1* | 10/2022 | Crowe | G06Q 30/0251 |

* cited by examiner

PARTICIPANT ATTENDANCE MANAGEMENT AT EVENTS INCLUDING VIRTUAL REALITY EVENTS

TECHNICAL FIELD

The subject application relates to the acquiring of event attendee information in general, and more particularly to managing saved attendee information, and related embodiments.

BACKGROUND

Users who participate in an event, including remotely such as attending a virtual reality presentation of the event, do not have a convenient manner to indicate their attendance. This is true whether the user is remotely attending the original event, or a replay of the event.

Moreover, there is no convenient way to manage a user's own attendance data. Some users may need proof of attendance, for example to receive compensation for taking a work-related seminar. Other users may not want their attendance known regarding some event, such as an attendee who gave a false excuse as to why he could not have been somewhere when he should have been, when the real reason was that he was attending a virtual reality live concert at the time.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
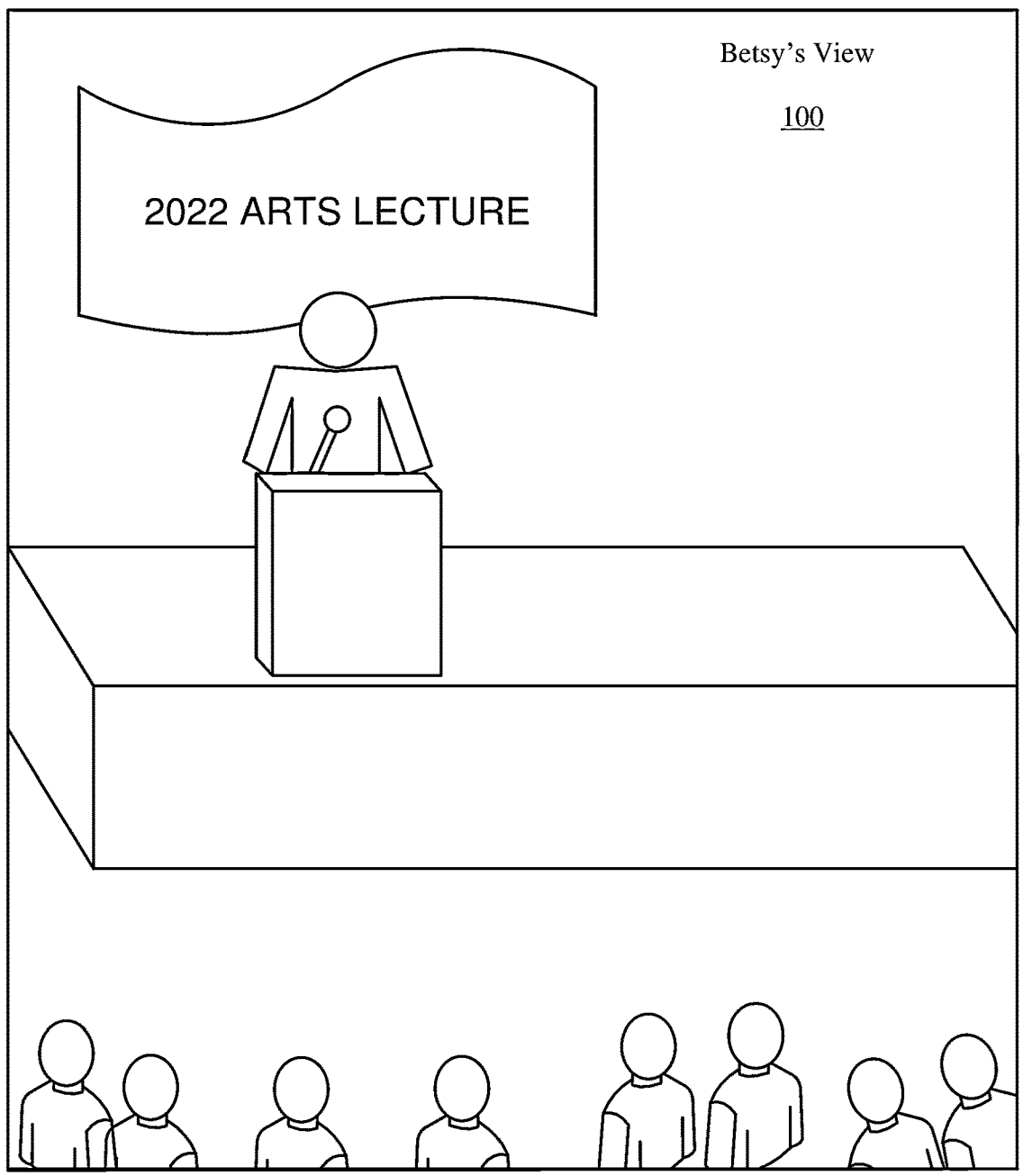
FIG. 1 is a representation of an example virtual reality view of a first user attending an event via a virtual reality viewing device, in accordance with various aspects and embodiments of the subject disclosure.
Figure 1:
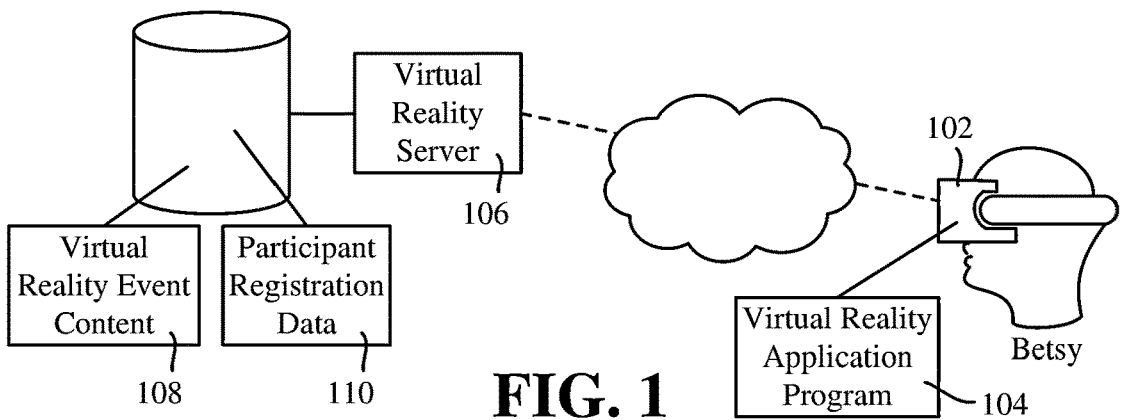

The technology described herein is generally directed towards the presentation of digital representations, such as avatars, of one or more remote attendees at an event, which can be a virtual reality event. Attendees may be presented in an aggregate view, including as avatars, independent of when the attendee experienced the event. For example, a representation of an avatar of an attendee can be output to other viewers during a current presentation of the event, or by having attended the event at a prior time.

In one implementation, the technology provides a convenient way for a user who participates in a virtual reality event to manage a representation of his or her attendance at an. For example, attendees may obtain proof of their attendance of the original event. Further, attendees may control their attendance privacy, including retroactively.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a view of a user, Betsy, attending a live event remotely, represented by Betsy's view 100. In this example, the user is equipped with a virtual reality viewer device 102 and a virtual reality application program 104; the program 104 may be incorporated into the device 102, or may be running on a different device coupled to the viewer 102. Note however that the technology described herein is not limited to virtual reality events, as a participant can remotely attend in a different, non-virtual reality way, such as via a television set, computer monitor, smartphone, and the like. An event can, for example, be live streamed in both a virtual reality stream and a conventional stream, e.g., standard definition or high definition video with 2K resolution and/or 4K resolution and the like. An event can be presented as an extended reality (XR) event, including augmented reality (AR), virtual reality (VR), or mixed reality (MR).

As shown in the example of FIG. 1, the device 102/program 104 are coupled to a virtual reality server 106 to view and participate in the virtual reality event. The virtual reality event may be a live streamed event, e.g., with the event content (block 108) saved for replay in a suitable data store 110. In FIG. 1, the depicted event is a lecture, although other such events may be a concert, a sporting event, a conference, a seminar, or any number of other types of events that have a plurality of audience members. The audience members depicted in FIG. 1 may be in-person attendees, representations (e.g., avatars) of remote attendees, or a combination of both in-person attendees and representations of remote attendees. The lecturer behind the podium can be an in-person or a representation of the lecturer.

Figure 2:
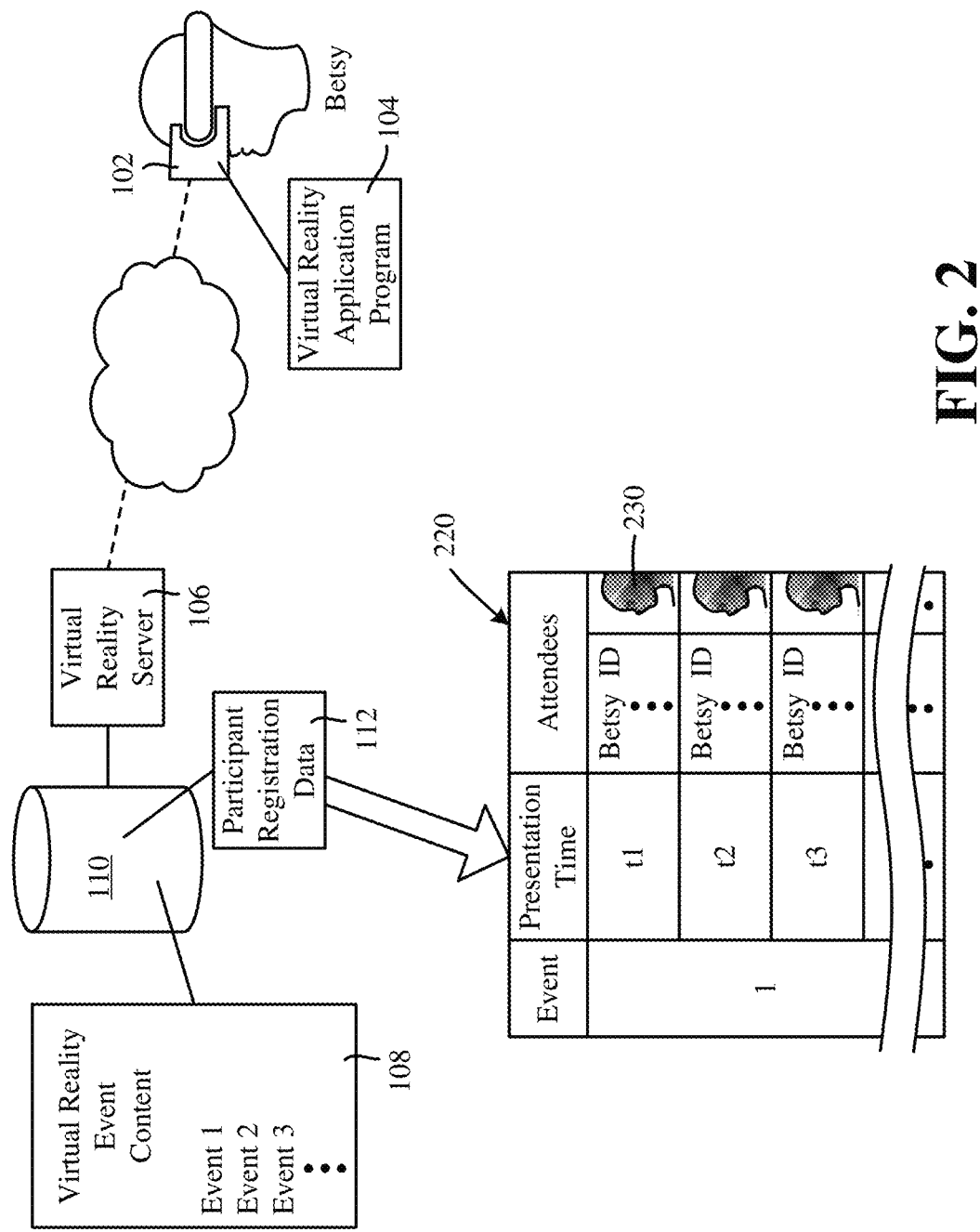
FIG. 2 is a representation of example participant registration data used to associate attendees with events, in accordance with various aspects and embodiments of the subject disclosure.

Betsy's participation in the event is registered in a participant registration data store 112, e.g., a database. As shown in FIG. 2, participation is registered by having Betsy's user ID stored as data 220 in the participant registration database with an indication that she is participating in the event at time t1 (which can be an actual date/timestamp). FIG. 2 Betsy's participation at other times, t2, t3, etc., may also be registered in the participant registration database such that the participant registration database includes all or a range of points in time of Betsy's participation in the original live presentation of the virtual reality event. The recorded times can be periodic, such as every five minutes, or based on some other starting and stopping points, e.g., at some time $t_x$ at the start, at another time $t_y$ after resuming from a break, and so on.

The participant registration data may be saved as a blockchain transaction as proof of attendance at the original live event for each attendee. The blockchain transaction may generate a transaction ID and may record the Event ID, the Attendee ID, and a range of times during which the attendee experienced the VR event. The blockchain transaction ID representing Betsy's attendance may be sent to Betsy or otherwise made available to her.

Figure 3:
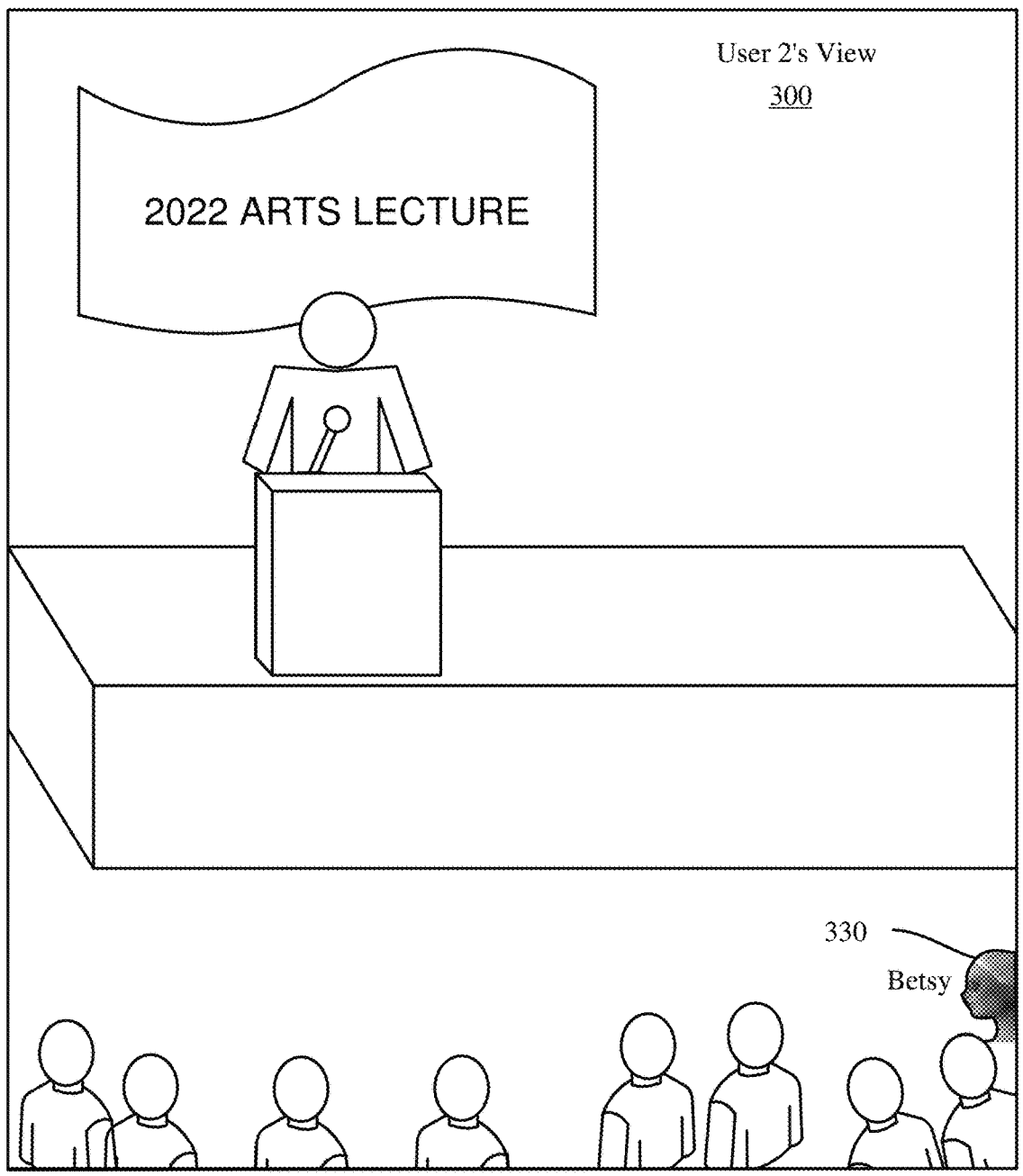
FIG. 3 is a representation of an example virtual reality view of a second user attending an event, in which an avatar of the first user is inserted into the via a virtual reality view of the second user, in accordance with various aspects and embodiments of the subject disclosure.
Figure 3:
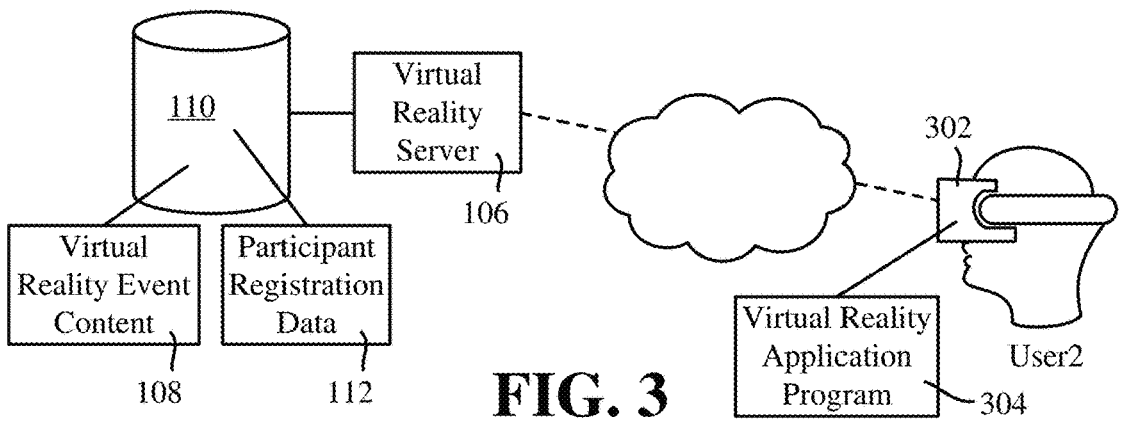

As shown in FIG. 3, another remote attendee of the live event, user 2 with a similar virtual reality viewer 302 and program 304, would see in User 2's view 300, for instance, an avatar 330 that represents Betsy and emulates her attendance as "in-person" during the live event, (to an extent, as the avatar is not generally seen as a real person). The avatar 330 can include a digital representation 230 (FIG. 2), which can be a face, an image, a more complete or complete avatar, e.g., provided by Betsy; (although shown as saved repeatedly for each timestamp t1, t2 and t3, it is alternatively feasible to store the image elsewhere and maintain links to the image). The avatar may be accompanied with a text label, such as Betsy's name, to help others in identifying her. Note that a user may need to interact to see such a label, as in a large audience the view would be inundated with such labels, and/or the size of the audience can be used to determine how to display labeling, and/or some limits can be used (a viewer can only see labels for attendees that are also his social media contacts). Note that Betsy's view 100 (FIG. 1) does not include the representation of her shown to herself. It is alternatively feasible, however, to offer a view that does show Betsy to herself, e.g., to visually confirm to Betsy that she is properly registered as attending.

At the conclusion of the live presentation of the event, the full event may be stored as event content in the virtual reality event content 108 data store. As set forth with reference to FIG. 2, also associated with the event may be the participant registration data, such that there is a record of which attendees were present at what portions of time during the live event. Moreover, the avatar or other digital representation 230 of Betsy may be stored in the participant registration data. This data facilitates a creation of the audience participation virtual reality view to include Betsy as a member of the audience, even though she does not attend a "replay" of the virtual reality event.

Figure 4:
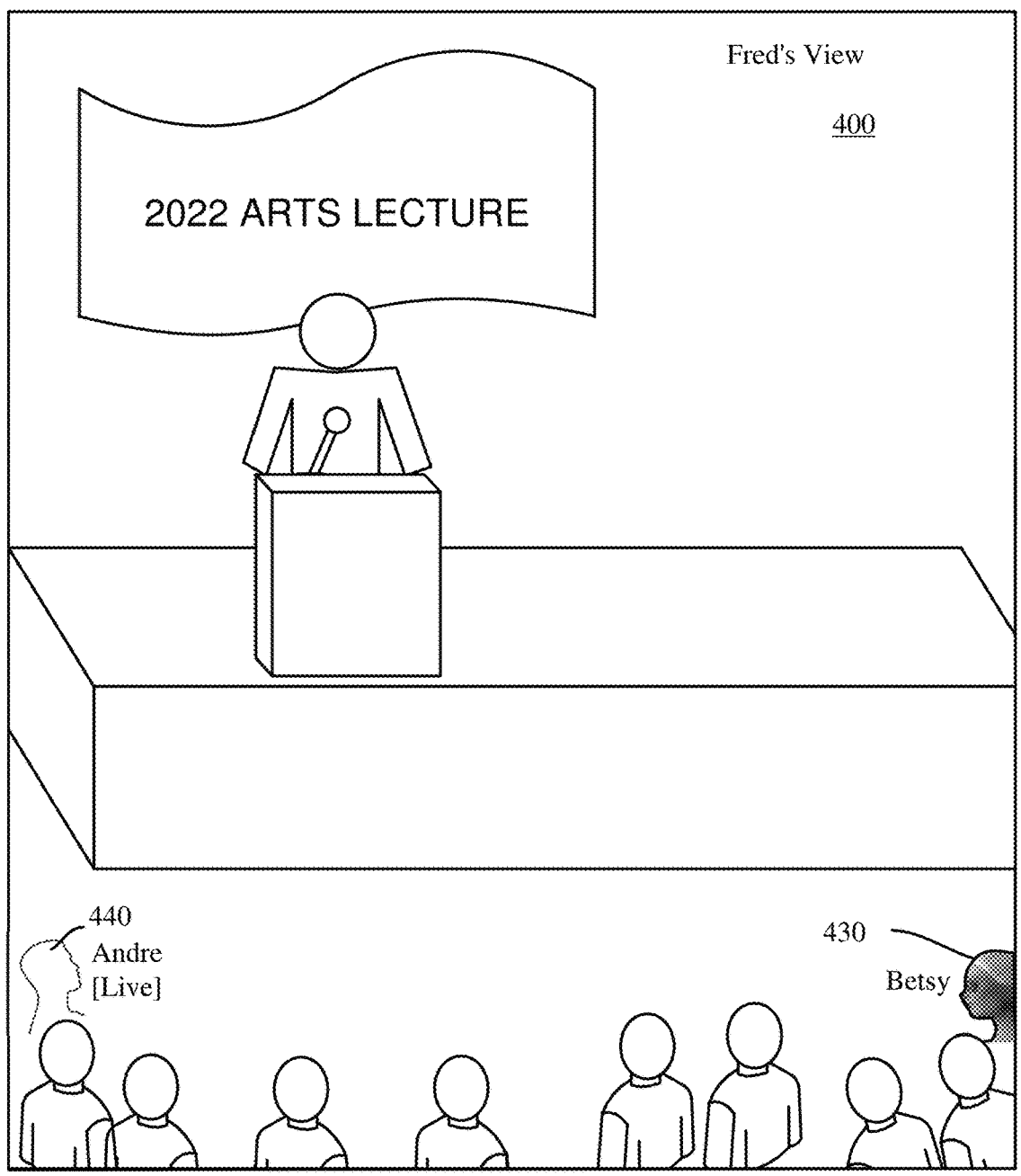
FIG. 4 is a representation of an example virtual reality view of a second user attending an event via replay, in which an avatar of the first user is inserted into the virtual reality replay view, in accordance with various aspects and embodiments of the subject disclosure.
Figure 4:
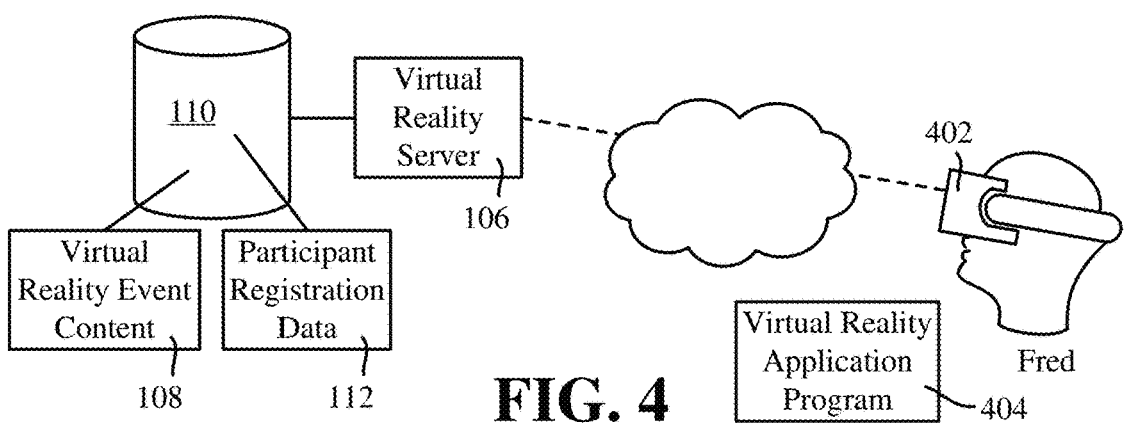

During a subsequent presentation of the event, that is, a virtual reality or other replay, as shown in FIG. 4 a user "Fred" is viewing via a similar virtual reality headset 402 and virtual reality application program 404. To this end, at a subsequent time, t4, the other user Fred has requested to view a "replay" of the virtual reality event that occurred earlier. The virtual reality server 106 accesses the virtual reality event content 108 as well as the participant registration data 112 to present not only the content and the other audience members as avatars who are viewing the event at the same time that Fred is, but also, audience members who viewed the event at a previous time, such as Betsy. Other audience members who are viewing the event at the same time as Fred, e.g., Andre 440 (with a more generic avatar relative to Betsy's, for example), may be indicated as viewing the event live (that is, also viewing a replay instance at generally the same time). Note that Betsy's replayed avatar 430 remains unchanged; however as one alternative, a different avatar can be used for replays, and also there can be some indication of when Betsy attended, e.g., a text label "[Original]" or the like can be overlaid on the presentation to indicate that Betsy attended the event at the original, live presentation.

Figure 5:
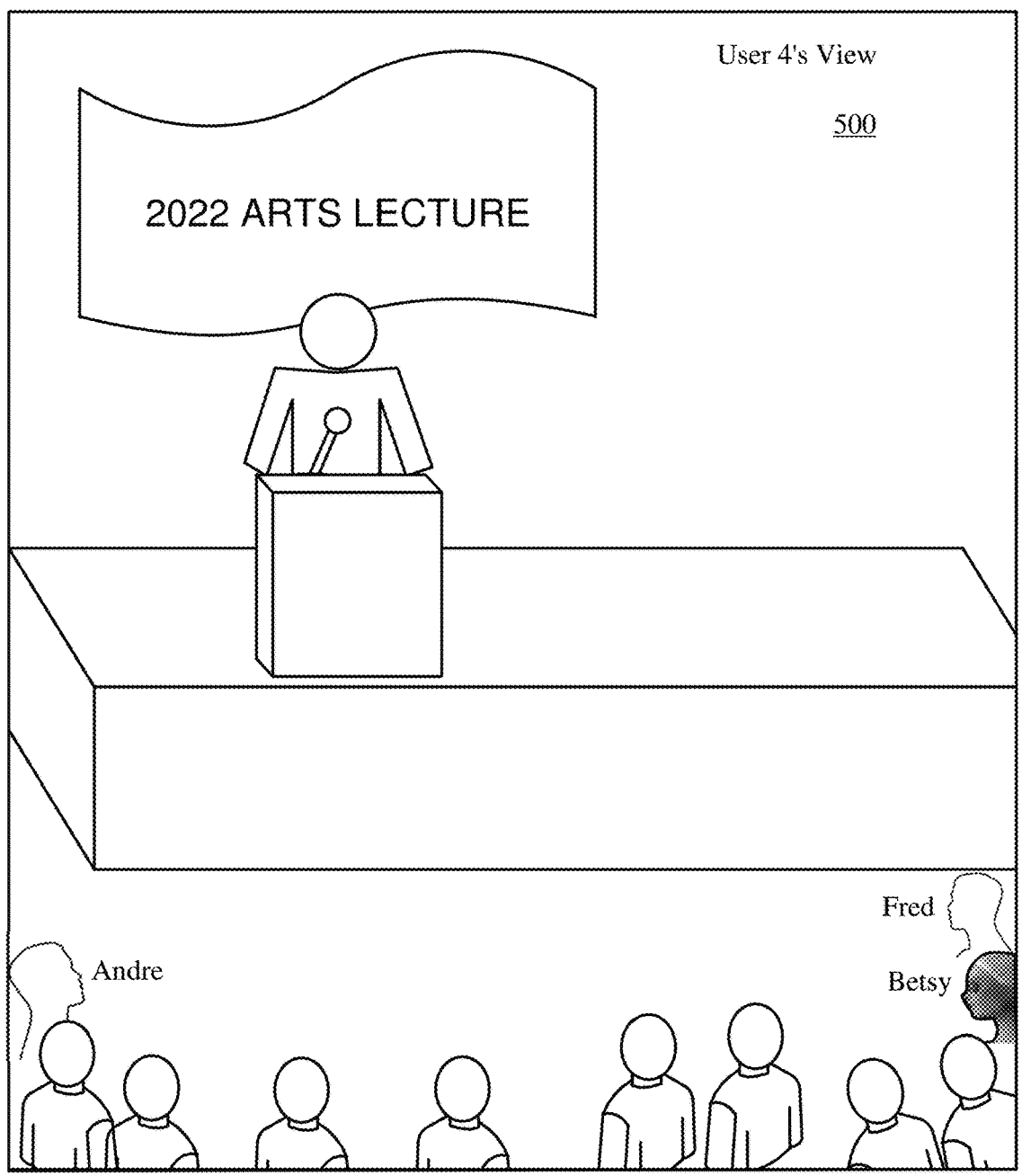
FIG. 5 is a representation of an example virtual reality view of a later user attending an event via a later replay, in which avatar of attendees including those who have viewed a previous replay are inserted into the later replay's virtual reality view, in accordance with various aspects and embodiments of the subject disclosure.
Figure 5:
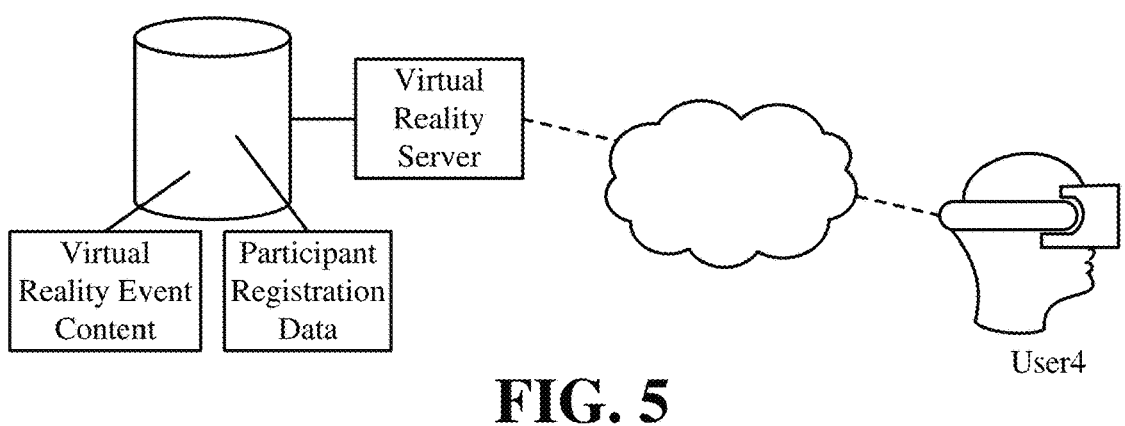

The event again may be presented at yet another later time t5 to another User 4. In this case, as shown in FIG. 5 in User 4's view 500, the previous attendees (e.g., including Betsy, Andre and Fred) may be presented as members of the audience, even though they previously viewed the event at different times. Again, if desired, some additional text labeling can be overlaid on the time t5 replay presentation, e.g., Betsy "[Original]" and Andre and Fred "[Replay]" or the like.

Turning to management of the attendance data, at some point later, Betsy may wish to access the participant registration data or the blockchain data to verify her attendance at the event, and moreover, her attendance at the original presentation of the event. The virtual reality server 108 may retain a record of timestamps associated with the original presentation of the live event. By comparing the timestamps of the original presentation of the live event with the timestamps of Betsy's attendance of the event, her attendance of the live event may be verified. Betsy may access this data using the blockchain transaction ID or other ID that is sent to her by the virtual reality server 108 and may retrieve a record of proof of her attendance at the original live event as needed. Fred and Andre can likewise obtain proof of attendance at their respective replay times.

Figure 6:
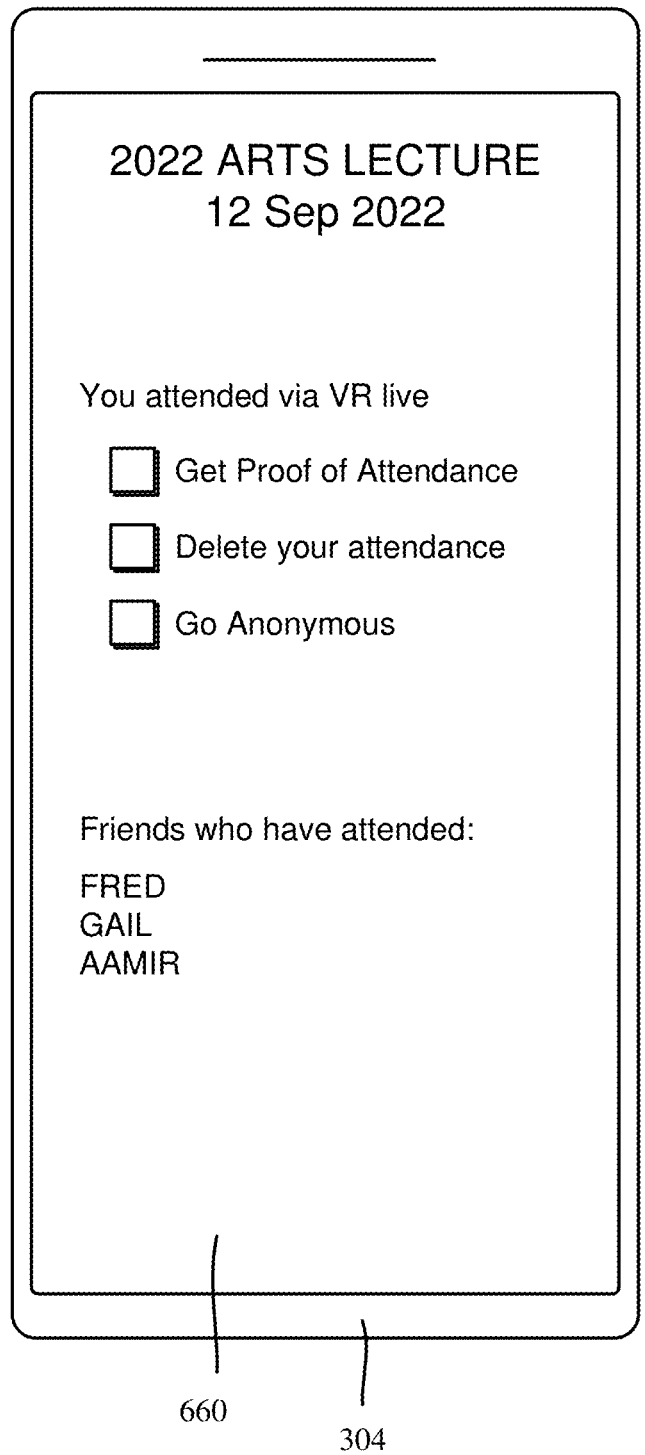
FIG. 6 is a representation of an example user interface by which a user can manage attendance data, in accordance with various aspects and embodiments of the subject disclosure.

A user may be granted access to his or her own attendance data for the purpose of editing the attendance data. By providing access to Betsy of her participant registration data, as shown in FIG. 6 Betsy also may be presented with an optional capability to edit her attendee data 112 within the data store 110. In this manner, she may for instance, delete herself from attending an event or make her attendance of the event anonymous. This may be done retroactively, after her participation in the event. Note that it is also possible for a person to register anonymously so that his or her attendance is not known, even at the live event presentation to other live event viewers; (for example, in FIG. 3 there would be a generic avatar instead of Betsy's avatar shown).

Betsy may login with the transaction ID or other credentials provided to her and select "Delete your attendance" in the example of FIG. 6. By doing so, a request is sent to the participant registration database and Betsy's entries therein for the event are deleted. Alternatively, she may select "Go anonymous" in this example. In this case the request is an indication for the data in the participant registration database to include an anonymous indicator for Betsy's attendance, along with a generic avatar.

During subsequent presentations of the event, after Betsy deleted her attendance, the virtual reality event server 108 that uses the event's associated participant registration data to recreate and include prior participants and current participants will exclude Betsy in the presentation of the virtual reality content.

Figure 7:
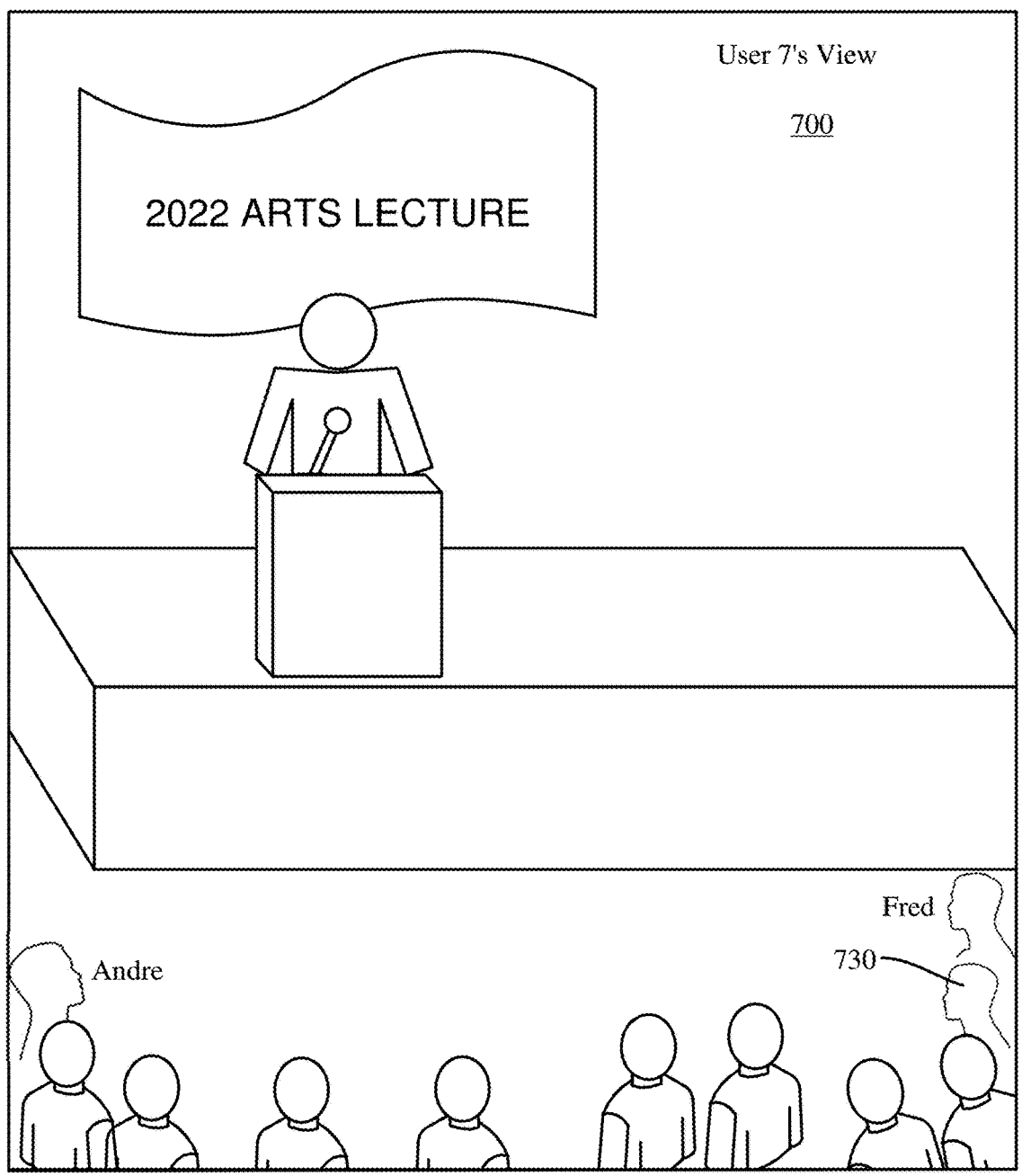
FIG. 7 is a representation of an example virtual reality view of a later user attending an event via a later replay, in which a generic avatar is inserted into the replay's virtual reality view to represent an anonymous attendee, in accordance with various aspects and embodiments of the subject disclosure.
Figure 7:
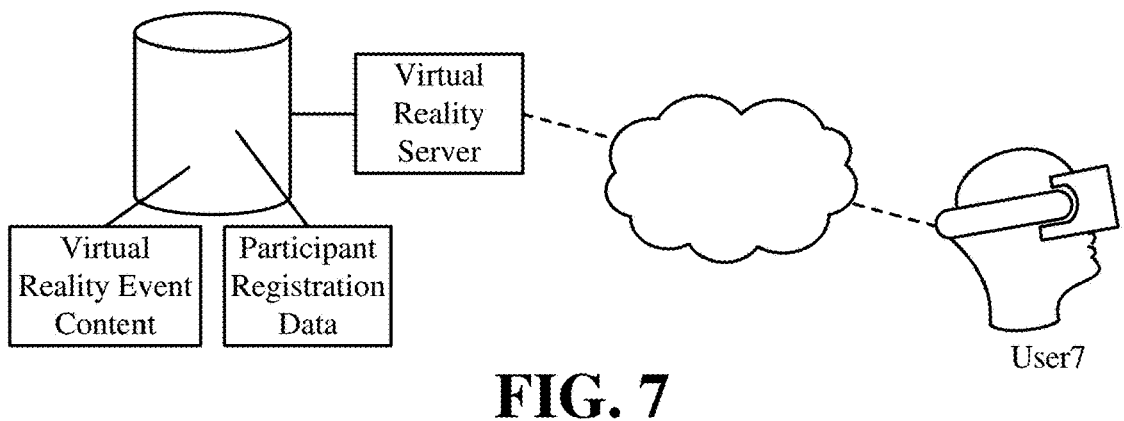

If instead Betsy had selected to make her attendance anonymous, an avatar may still be presented and included amongst those counted for participation, but a generic avatar can be displayed, and no identifying data for Betsy is presented. An example is shown in FIG. 7, where a viewer (User 7) does not see Betsy in the view 700. Instead, a generic avatar 730 is shown to emulate attendance by someone, but without a label or other identifying characteristics (such as a facial image).

Although not explicitly shown in FIG. 6, it is straightforward for a person to select certain users (e.g., social media contacts) who can see the user's attendance, other users to whom the user's attendance is deleted, and/or other users to whom attendance is represented anonymously. For example, a user who remotely attends a concert may want her presence known to her friends, but not to someone else. A global preference in the system for a user's data can set such conditions, for example, as to who can see and who cannot. The user can choose to go anonymous, but for even more privacy, may delete her presence entirely, so that, for example, other viewers cannot deduce her presence via an anonymous avatar that is most likely her given the group of friends who did attend without attendance deletions or anonymity declarations.

Conversely, a user who attends an event may need proof of attendance for one entity, but not want her friends to know about their attendance at the event. It is thus feasible to declare an entity for receiving proof of attendance, but also delete or go anonymous to others. A user can check more than one selection box in FIG. 6, for example, and do both. Deletion can still retain some data in the data store, e.g., in encrypted form with a decryption key only known to the user.

Figure 8:
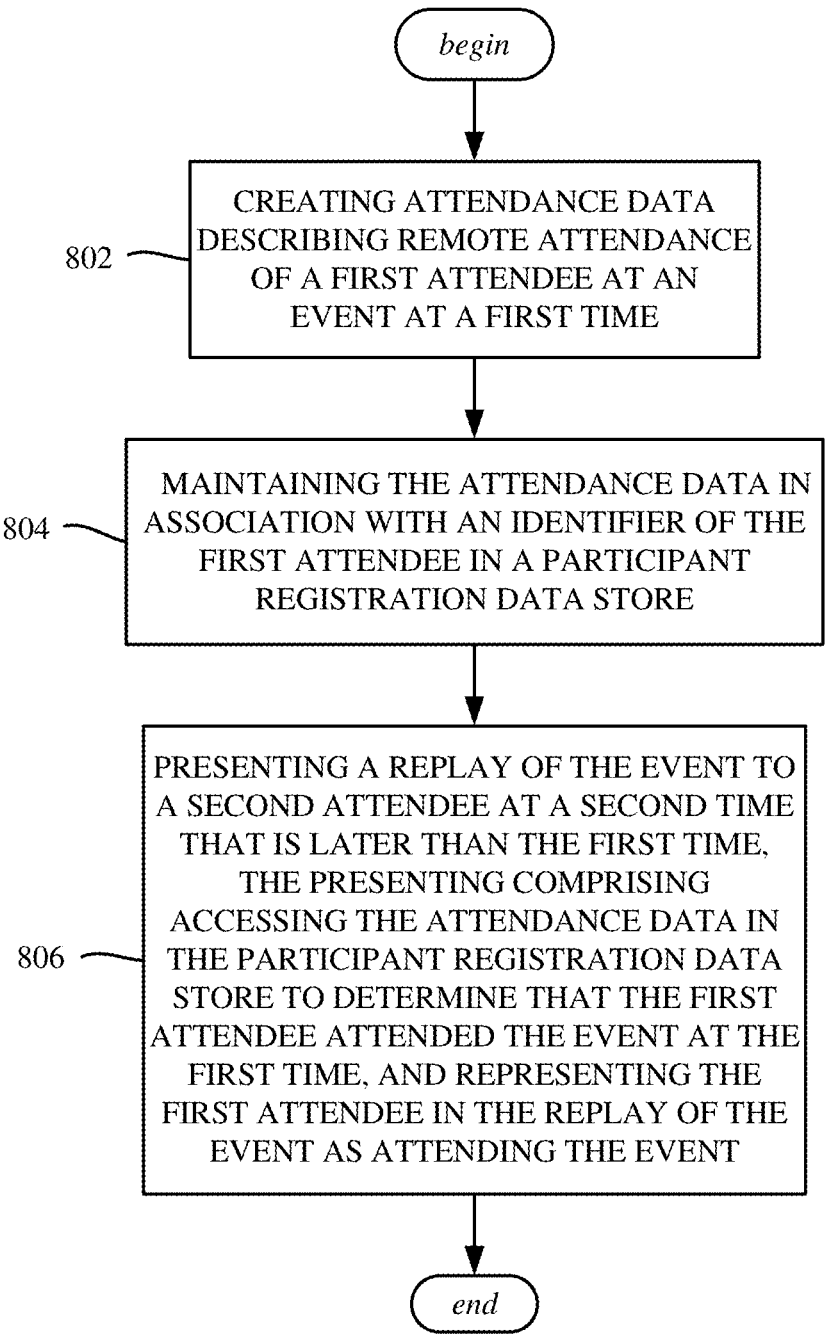
FIG. 8 is a flow diagram representing example operations related to creating attendance data for a remote attendee and using that attendance data to present a replay of the event that includes a representation of the remote attendee, in accordance with various aspects and embodiments of the subject disclosure.

One or more example aspects are represented in FIG. 8, and can correspond to a system, including a processor, and a memory that stores executable instructions that, when executed by the processor, facilitate performance of operations. Example operation 802 represents creating attendance data describing remote attendance of a first attendee at an event at a first time. Operation 804 represents maintaining the attendance data in association with an identifier of the first attendee in a participant registration data store. Operation 806 represents presenting a replay of the event to a second attendee at a second time that is later than the first time, the presenting comprising accessing the attendance data in the participant registration data store to determine that the first attendee attended the event at the first time, and representing the first attendee in the replay of the event as attending the event.

The event can be a live event at the first time, and representing the attendee as attending the event at the first time can include augmenting a live video feed of the event with a visible representation of the first attendee to emulate the attendee as attending the event in-person at the first time as viewed by a third attendee remotely attending the event at the first time.

Representing of the attendee as attending the event can include augmenting the replay with a visible representation of the first attendee to emulate the attendee as attending the event in-person.

The event can be streamed to a virtual reality device of the first attendee via a virtual reality video stream.

The attendance data can be first attendance data, the identifier of the first attendee can be a first identifier, wherein the replay can be a first replay, and further operations can include maintaining second attendance data in association with a second identifier of the second attendee in the participant registration data store, and presenting a second replay of the event to a third attendee at a third time that is later than the second time; presenting can include accessing the attendance data store to determine that the second attendee attended the event at the second time, and representing the second attendee in the second replay of the event as attending the event.

Further operations can include accessing the participant registration data store to obtain proof of the attendance of the first attendee.

The attendance data describing the attendance of the first attendee can be associated with time data comprising at least one indication of when the first attendee attended the event.

Further operations can include receiving a request to delete the attendance data in association with the identifier of the first attendee, and, in response to the request, deleting the attendance data.

Further operations can include receiving a request by the attendee to anonymize the attendance data, and, in response to the request, accessing the participant registration data store to disassociate the attendance data from the identifier of the first attendee.

Further operations can include receiving a request by the attendee to anonymize the attendance data with respect to a specified entity, and, in response to the request, accessing the participant registration data store to disassociate, from a perspective of the specified entity, the attendance data from the identifier of the first attendee.

Further operations can include receiving a request by the first attendee to maintain the attendance data with respect to a specified contact, and, in response to the request, accessing the participant registration data store to make the attendance data inaccessible other than to the first attendee and the specified contact.

Maintaining of the attendance data can include maintaining the attendance data in the participant registration data store as a blockchain transaction.

Figure 9:
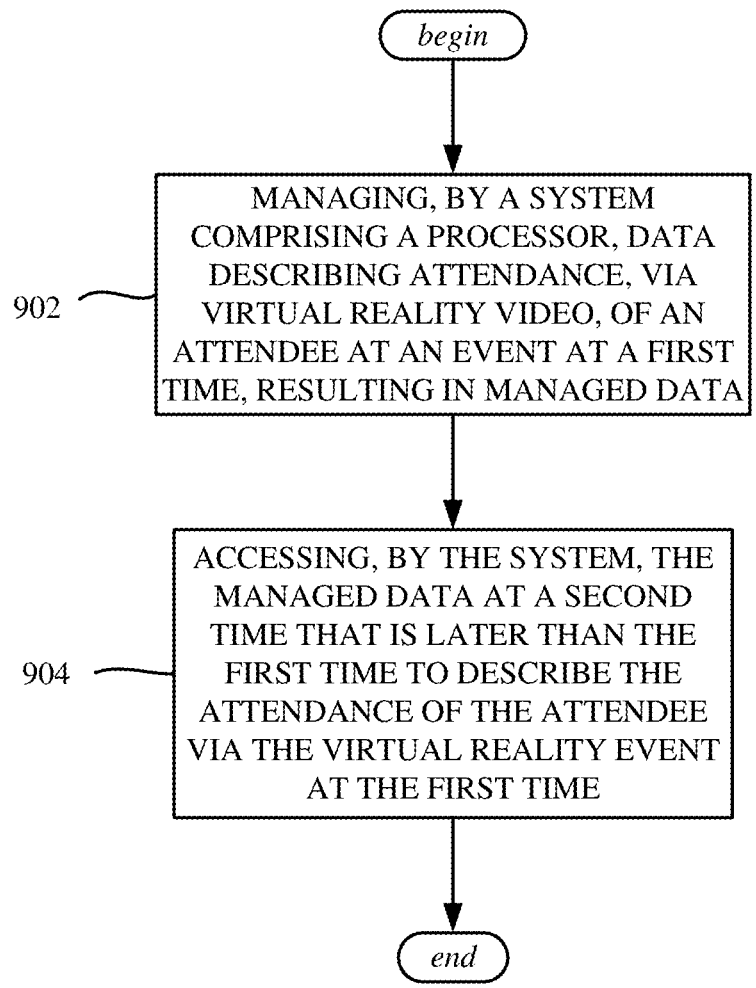
FIG. 9 is a flow diagram representing example operations related to managing attendee data of an event, in accordance with various aspects and embodiments of the subject disclosure.

One or more example aspects are represented in FIG. 9, and, for example, can correspond to operations, such as of a method. Example operation 902 represents managing, by a system comprising a processor, data describing attendance, via virtual reality video, of an attendee at an event at a first time, resulting in managed data. Operation 904 represents accessing, by the system, the managed data at a second time that is later than the first time to describe the attendance of the attendee via the virtual reality event at the first time.

The attendee can be a first attendee, and further operations can include presenting, by the system, a replay of the event to a second attendee, including augmenting the replay, based on the managed data.

Managing the data describing the attendance of the attendee at the virtual reality event can include providing proof of the attendance at the event by the attendee.

Managing the data describing the attendance of the attendee at the virtual reality event can include deleting the attendance data.

Managing the data describing the attendance of the attendee at the virtual reality event can include making the attendance data anonymous.

Figure 10:
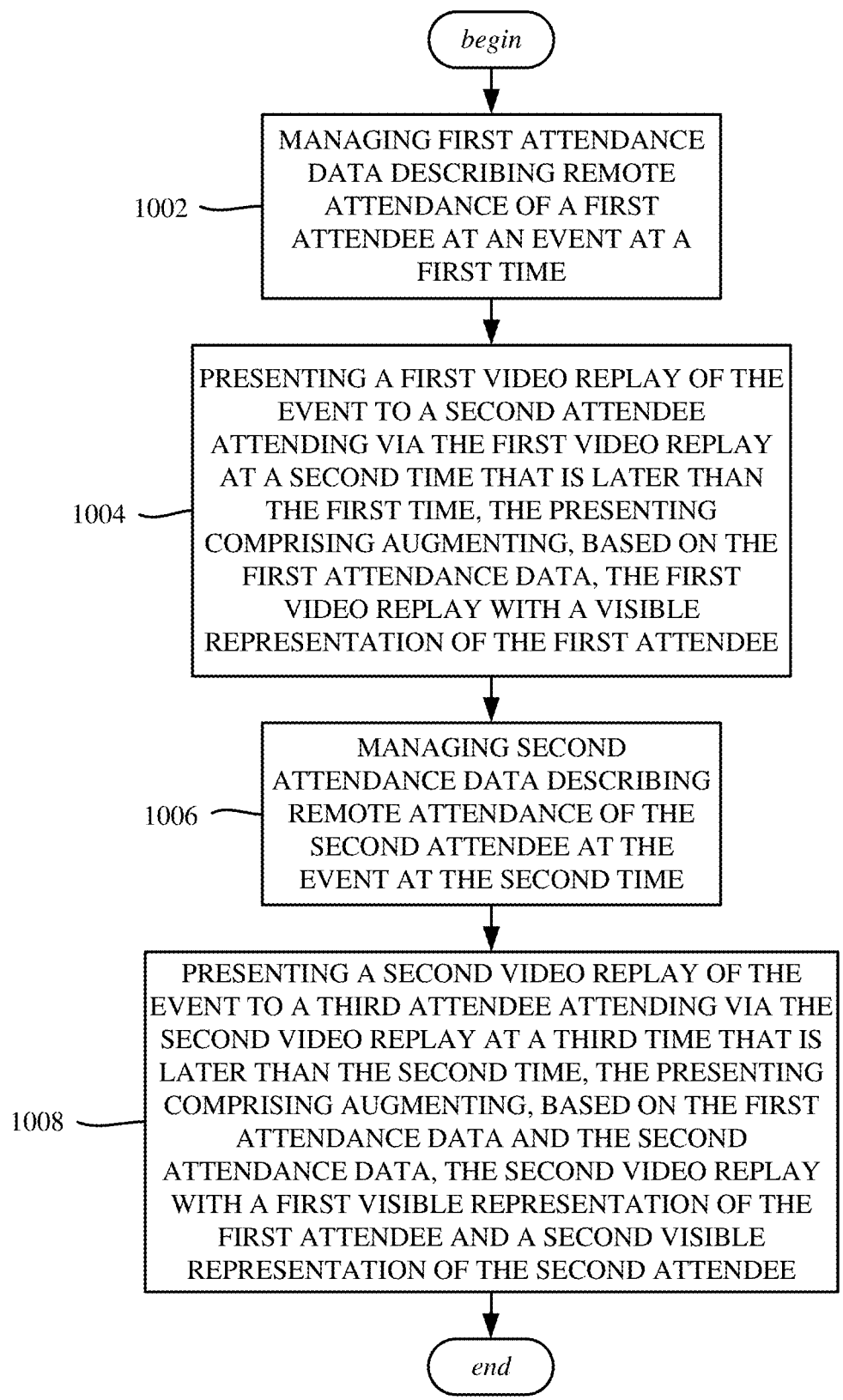
FIG. 10 is a flow diagram representing example operations related to creating attendance data for remote and replay attendees and using that attendance data to present a later replay of the event that includes representations of the remote and replay attendees, in accordance with various aspects and embodiments of the subject disclosure.
Figure 11:
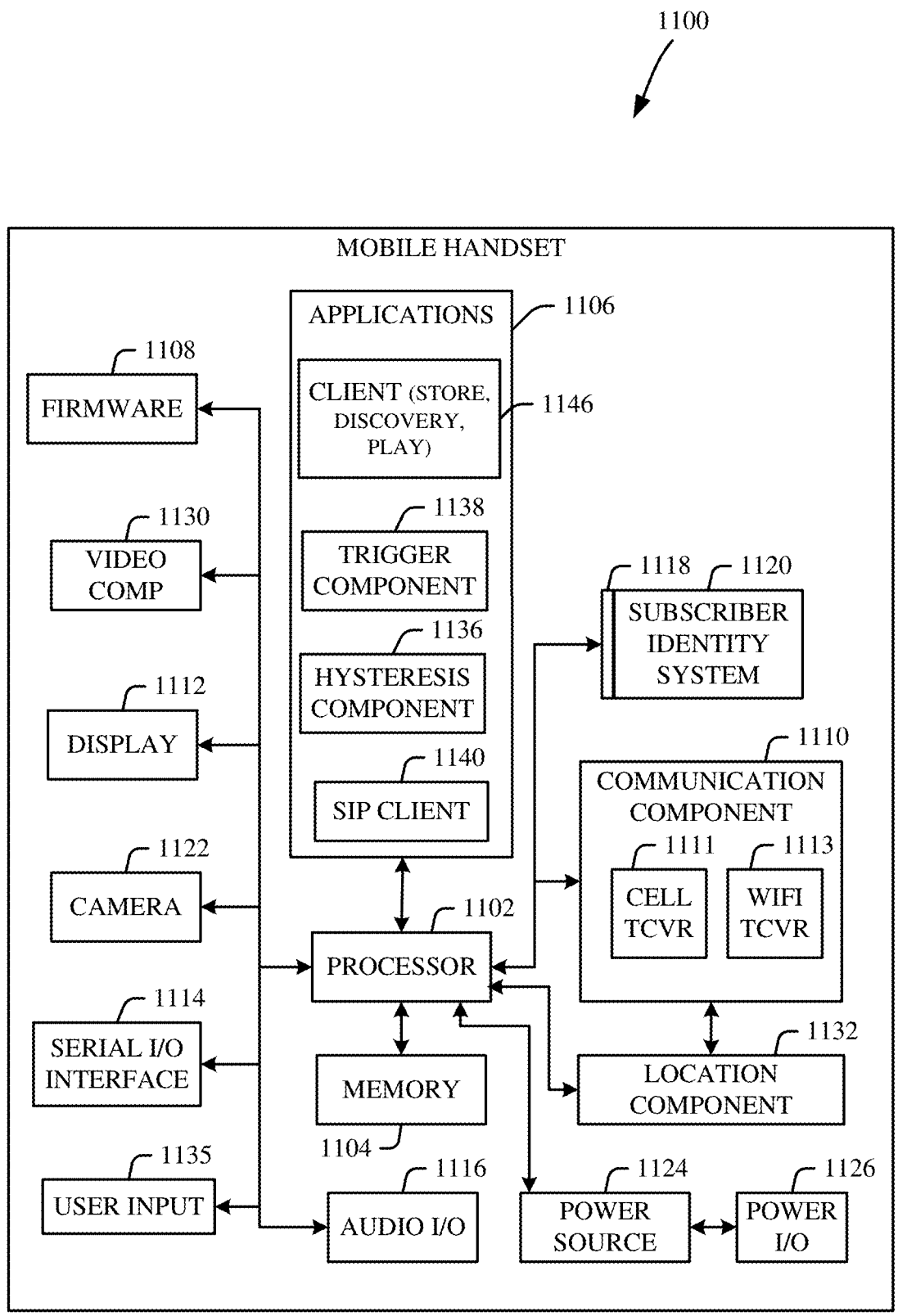
FIG. 11 illustrates an example block diagram of an example mobile handset operable to engage in a system architecture that facilitates wireless communications according to one or more embodiments described herein.
Figure 12:
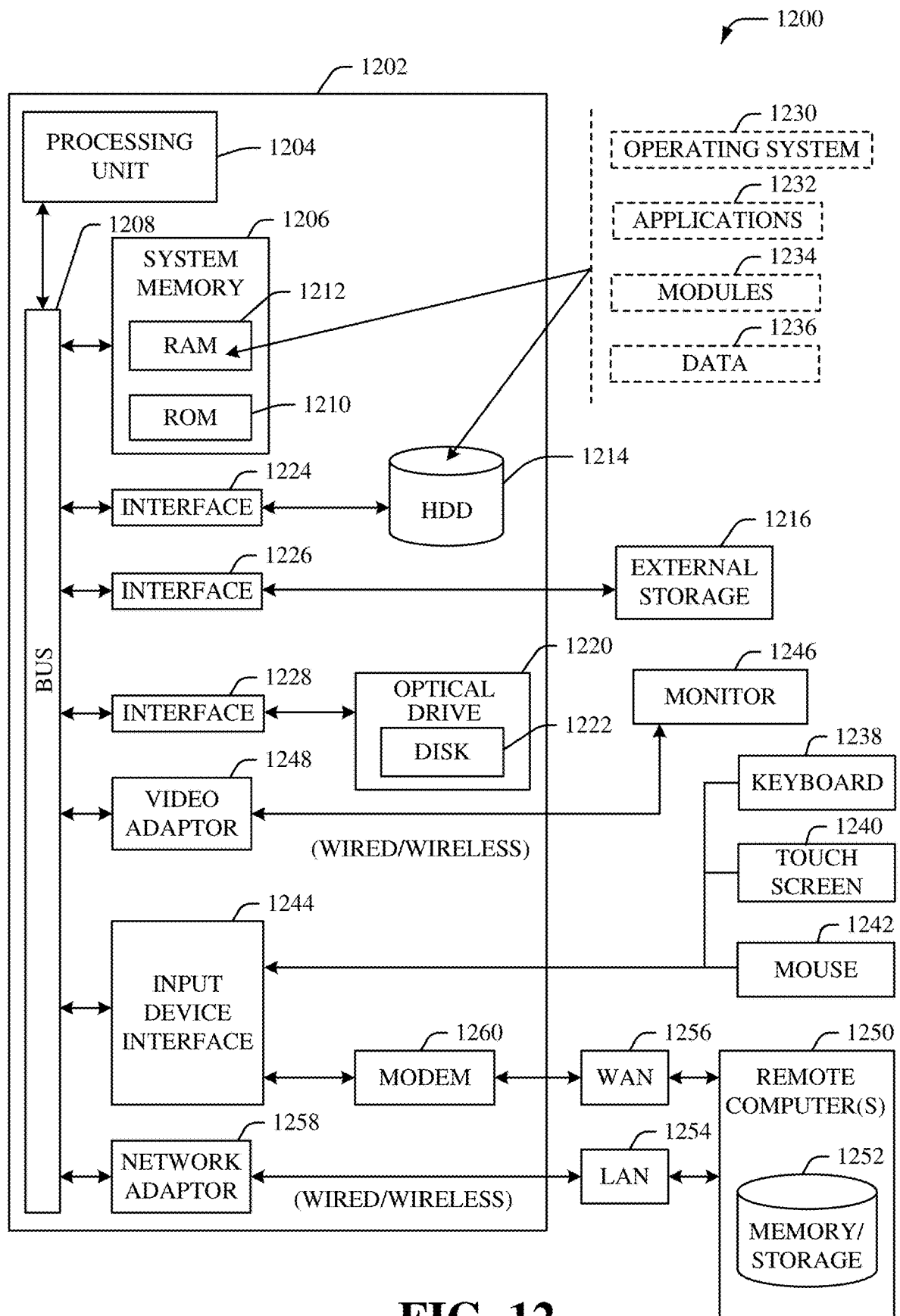
FIG. 12 illustrates an example block diagram of an example computer/machine system operable to engage in a system architecture that facilitates wireless communications according to one or more embodiments described herein.

One or more aspects are represented in FIG. 10, such as implemented in a machine-readable medium, including executable instructions that, when executed by a processor, facilitate performance of operations. Example operation 1002 represents managing first attendance data describing remote attendance of a first attendee at an event at a first time. Operation 1004 represents presenting a first video replay of the event to a second attendee attending via the first video replay at a second time that is later than the first time, the presenting including augmenting, based on the first attendance data, the first video replay with a visible representation of the first attendee. Operation 1006 represents managing second attendance data describing remote attendance of the second attendee at the event at the second time. Operation 1008 represents presenting a second video replay of the event to a third attendee attending via the second video replay at a third time that is later than the second time, the presenting comprising augmenting, based on the first attendance data and the second attendance data, the second video replay with a first visible representation of the first attendee and a second visible representation of the second attendee.

Further operations can include receiving, before the second time, a request to anonymize the attendance of the first attendee; augmenting the second video replay with the first visible representation of the first attendee can include representing the first attendee as an anonymous avatar.

Further operations can include receiving, before the third time, a request to delete the attendance of the second attendee, presenting a third video replay of the event to a fourth attendee attending via the third video replay at a fourth time that is later than the third time; presenting can include comprising streaming the third video replay with an augmented visible representation of the first attendee that augments the first visible representation, and without the second visible representation of the second attendee.

As can be seen, the technology described herein facilitates user management of remote participation in an event, such as attending an event by virtual reality. The technology provides a convenient and straightforward way for users to manage representations of their attendance at the event, including when the event may be replayed. The technology described herein allows for displaying representations of the attendance of the attendees of the event in an aggregate view, independent of when they experienced the event.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Referring now to FIG. 13, illustrated is a schematic block diagram of an example end-user device (such as user equipment) that can be a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD), non-volatile memory and other storage technology could be used in addition to, or in place of, an HDD 1414, and can be internal or external. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally include emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can include one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 14 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system, facilitate performance of operations, the operations comprising:
creating attendance data describing remote attendance of a first attendee at an event at a first time;
maintaining the attendance data in association with an identifier of the first attendee in a participant registration data store;
presenting a replay of the event to a second attendee at a second time that is later than the first time, the presenting comprising accessing the attendance data in the participant registration data store to determine that the first attendee attended the event at the first time, and representing the first attendee in the replay of the event as attending the event, wherein the first attendee is represented in the replay of the event by an avatar, wherein the avatar is shown with a label identifying the first attendee only in a case that the first attendee is a social media contact of the second attendee, and wherein the label indicates in text form that the first attendee had been an original attendee; and
responsive to receiving input from the first attendee, modifying the attendance data, that corresponds to the first attendee and that is in the participant registration data store, into an encrypted form with a decryption key only known to the first attendee.

2. The system of claim 1, wherein the event comprises a live event at the first time, and wherein the representing of the first attendee as attending the event at the first time comprises augmenting a live video feed of the event with the avatar of the first attendee to emulate the first attendee as attending the event in-person at the first time as viewed by a third attendee remotely attending the event at the first time.

3. The system of claim 1, wherein the representing of the first attendee as attending the event comprises augmenting the replay with the avatar of the first attendee to emulate the first attendee as attending the event in-person.

4. The system of claim 1, wherein the event is streamed to a virtual reality device of the first attendee via a virtual reality video stream.

5. The system of claim 1, wherein the attendance data is first attendance data, wherein the identifier of the first attendee is a first identifier, wherein the replay is a first replay, and wherein the operations further comprise maintaining second attendance data in association with a second identifier of the second attendee in the participant registration data store, presenting a second replay of the event to a third attendee at a third time that is later than the second time, the presenting the second replay comprising accessing the participant registration data store to determine that the second attendee attended the event at the second time, and representing the second attendee in the second replay of the event as attending the event.

6. The system of claim 5, wherein the operations further comprise receiving a request to delete the second attendance data in association with the second identifier of the second attendee, and, in response to the request, deleting the second attendance data.

7. The system of claim 5, wherein the operations further comprise receiving a request by the second attendee to anonymize the second attendance data, and, in response to the request, accessing the participant registration data store to disassociate the second attendance data from the second identifier of the second attendee.

8. The system of claim 5, wherein the operations further comprise receiving a request by the second attendee to anonymize the second attendance data with respect to a specified entity, and, in response to the request, accessing the participant registration data store to disassociate, from a perspective of the specified entity, the second attendance data from the second identifier of the second attendee.

9. The system of claim 5, wherein the operations further comprise receiving a request by the second attendee to maintain the second attendance data with respect to a specified contact, and, in response to the request, accessing the participant registration data store to make the second attendance data inaccessible other than to the second attendee and the specified contact.

10. The system of claim 1, wherein the operations further comprise accessing the participant registration data store to obtain proof of the attendance of the first attendee.

11. The system of claim 1, wherein the attendance data describing the attendance of the first attendee is associated with time data comprising at least one indication of when the first attendee attended the event.

12. The system of claim 1, wherein the label identifying the first attendee further comprises a name of the first attendee.

13. The system of claim 1, wherein the avatar comprises a facial image of the first attendee.

14. The system of claim 13, wherein the facial image is provided by the first attendee.

15. The system of claim 1, wherein the maintaining of the attendance data comprises maintaining the attendance data in the participant registration data store as a blockchain transaction.

16. The system of claim 15, wherein the blockchain transaction records a range of times of the attendance of the first attendee at the event.

17. The system of claim 15, wherein a blockchain transaction ID representing the attendance of the first attendee at the event is sent to the first attendee.

18. A method, comprising:
managing, by a system comprising a processor, data describing attendance, via virtual reality video, of a first attendee at an event at a first time, resulting in managed data;
accessing, by the system, the managed data at a second time that is later than the first time to describe the attendance of the first attendee via the virtual reality video at the first time;
presenting, by the system, a replay of the event to a second attendee by augmenting the replay, based on the managed data, with a representation of the first attendee that is visible to the second attendee, wherein the first attendee is represented in the replay of the event by an avatar, wherein the avatar is shown with a label identifying the first attendee only in a case that the first attendee is a social media contact of the second attendee, and wherein the label indicates in text form that the first attendee had been an original attendee; and
responsive to receiving input from the first attendee, modifying, by the system, the managed data, that corresponds to the first attendee and that is in a participant registration data store, into an encrypted form with a decryption key only known to the first attendee.

19. The method of claim 18, wherein the managing the data describing the attendance of the first attendee via the virtual reality video comprises providing proof of the attendance at the event by the first attendee.

20. A non-transitory machine-readable medium comprising executable instructions that, when executed by a processor, facilitate performance of operations, the operations comprising:
managing first attendance data describing remote attendance of a first attendee at an event at a first time;
presenting a first video replay of the event to a second attendee attending via the first video replay at a second time that is later than the first time, the presenting of the first video replay comprising augmenting, based on the first attendance data, the first video replay with a first visible representation of the first attendee, wherein the first visible representation is shown with a label identifying the first attendee only in a case that the first attendee is a social media contact of the second attendee, and wherein the label indicates in text form that the first attendee had been an original attendee;
managing second attendance data describing remote attendance of the second attendee at the event at the second time;
presenting a second video replay of the event to a third attendee attending via the second video replay at a third time that is later than the second time, the presenting of the second video replay comprising augmenting, based on the first attendance data and the second attendance data, the second video replay with a second visible representation of the second attendee; and responsive to receiving input from the first attendee, modifying the first attendance data, that corresponds to the first attendee and that is in a participant registration data store, into an encrypted form with a decryption key only known to the first attendee.

\* \* \* \* \*